US00RE35732E

United States Patent [19]

Shockley

[11] E Patent Number: Re. 35,732

[45] Reissued Date of Patent: Feb. 17, 1998

[54] TRANSFORMABLE MECHANIC'S CREEPER

[76] Inventor: Troy Shockley, 106 Robinall Dr., Easley, S.C. 29642

[21] Appl. No.: 649,852

[22] Filed: May 8, 1996

Related U.S. Patent Documents

Reissue of:

[64] Patent No.: 5,451,068
Issued: Sep. 19, 1995
Appl. No.: 243,715
Filed: May 17, 1994

[51] Int. Cl.[6] ..... B25H 5/00

[52] U.S. Cl. ..... 280/32.6

[58] Field of Search ..... 280/32.6, 30; 297/16.1, 297/16.2, 19; 248/129

[56] References Cited

U.S. PATENT DOCUMENTS

| | | | |
|---|---|---|---|
| 1,327,103 | 1/1920 | Knowles | 280/32.6 |
| 2,124,389 | 7/1938 | Woelfer, Jr. | 280/32.6 |
| 2,595,783 | 5/1952 | Griffin | 280/32.6 |
| 2,595,784 | 5/1952 | Griffin et al. | 280/32.6 |
| 2,611,417 | 9/1952 | Henry et al. | 280/32.6 X |
| 2,692,636 | 10/1954 | Morrison | 280/32.6 |
| 2,843,391 | 7/1958 | Pelletier | 280/32.6 |
| 4,025,106 | 5/1977 | Kyte | 297/16 |
| 4,895,380 | 1/1990 | Brooks et al. | 280/32.6 |
| 4,957,302 | 9/1990 | Maxwell | 280/32.6 |

FOREIGN PATENT DOCUMENTS

| | | | |
|---|---|---|---|
| 283330 | 1/1928 | United Kingdom | 280/32.6 |
| 2251828 | 7/1992 | United Kingdom | 280/32.6 |

*Primary Examiner*—Kevin Hurley
*Attorney, Agent, or Firm*—Cort Flint

[57] ABSTRACT

A transformable mechanic's creeper is disclosed having an elongated creeper frame which includes a base and a seat assembly interconnected by at least one interlinking connector pivotally connected to the base and the seat assembly. The interlinking connector has a first pivot position in which the seat assembly is positioned generally in horizontal alignment with the base for defining a creeper position, and a second pivot position in which the seat assembly is positioned generally in vertical alignment with the base to define a seating position wherein the seat assembly and the base support a worker in an upright seating position. A removable insert pad carried within the elongated creeper frame supports a worker in a supine position support.

17 Claims, 5 Drawing Sheets

TRANSFORMABLE MECHANIC'S CREEPER

Matter enclosed in heavy brackets [ ] appears in the original patent but forms no part of this reissue specification; matter printed in italics indicates the additions made by reissue.

BACKGROUND OF THE INVENTION

This invention relates to a mechanic's creeper, and more particularly to a mechanic's creeper which is transformable between a horizontal creeper and an upright seat.

During the performance of maintenance on automobiles and the like, it is often required that the mechanic be able to work under the chassis of the automobile. In the past, it has been known to use flat surfaces on wheels, known as creepers, enabling the mechanic to lie in a supine position and survey and work underneath the automobile. Additionally, it is known to use work bays where cars may be placed on hydraulic lifts and elevated to a position above an upright mechanic. Furthermore, mechanics sometimes use seats when working about the exterior of an automobile.

The problem has arisen in that to work on an automobile, the mechanic uses a creeper for work underneath the automobile's chassis, and a seat for work around the automobile's exterior. The use of two separate work platforms instead of one is an added expense to the mechanic. When considering that many automotive shops work on several cars at the same time, the redundancy in work platforms greatly increases the cost necessary to work on the automobiles. Furthermore, the work area around the automobile quickly becomes congested considering that several tools are used on an automobile; such as computer aided diagnostics and general hand held tools, along with replacement parts lying around the work area. Accordingly, depending on the work activity, either the seat or the creeper is not being utilized and merely takes up space around the work area, further congesting the work area and making it more difficult for an orderly work place to be maintained by the mechanic.

U.S. Pat. No. 2,692,636 shows a combination automobile mechanic's creeper and stool. The creeper and stool disclosed by U.S. Pat. No. 2,692,636 utilizes coil spring members which connect a left and right platform to a center platform. The springs collapse the left and right platforms inward to convert the creeper into a stool. Lock bolts lock the device into the stool and creeper position. Consequently, this apparatus in its natural state can be used neither as a creeper nor a stool and the coil spring members in action create a potentially dangerous work environment.

U.S. Pat. No. 2,611,417 shows a combination mechanic's creeper and stool which has leg units. The creeper uses cumbersome finger tabs for retracting rods which release the leg units enabling the legs to be pivoted rendering the creeper into a stool. The unclasping of the finger tabs is very cumbersome and requires the mechanic's creeper to either be laid on its back or to be lifted thereby exposing the finger tabs. Furthermore, when the creeper is in a stool position, the legs of the stool abut the ground and do not provide the creeper with mobility.

Accordingly, it is an object of the present invention to provide a transformable mechanic's creeper which can be transformed between a horizontal mechanic's creeper and an upright seat;

Additionally, it is an object of the present invention to provide for a transformable mechanic's creeper which is simple to use and easy to manufacture;

Furthermore, it is an object of the present invention to provide for a transformable mechanic's creeper which is transformable between a creeper and a seat merely by using pivoting members;

Additionally, it is an object of the present invention to provide for a transformable mechanic's creeper, which is transformable between a mechanic's creeper and a seat, which provides the mechanic mobility while utilizing the device in either the creeper or seat position.

SUMMARY OF THE INVENTION

The above objectives are accomplished according to the invention by providing a transformable mechanic's creeper having an elongated creeper frame which includes a base and a seat assembly interconnected by at least one interlinking connector in said elongated creeper frame with said base. The interlinking connector having a first end pivotally connected to the base, and a second end pivotally connected to the seat assembly such that the interlinking connector having a first pivot position in which the seat assembly is positioned generally in horizontal alignment with the base for defining a creeper position. The base and seat assembly being disposed near opposing ends of the elongated creeper frame when the elongated creeper frame is in the creeper position. Furthermore, the interlinking connector having a second pivot position in which the seat assembly is positioned generally in vertical alignment with the base such that the seat assembly and the base support a worker in an upright seating position.

A removable insert pad which carried within the elongated creeper frame providing a worker in a supine position support when the elongated creeper frame is in the creeper position. The removable insert pad being removed enabling the interlocking connector to pivot from first pivot position to second pivot position whereby the elongated creeper frame is positioned from a creeper position to a seating position.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
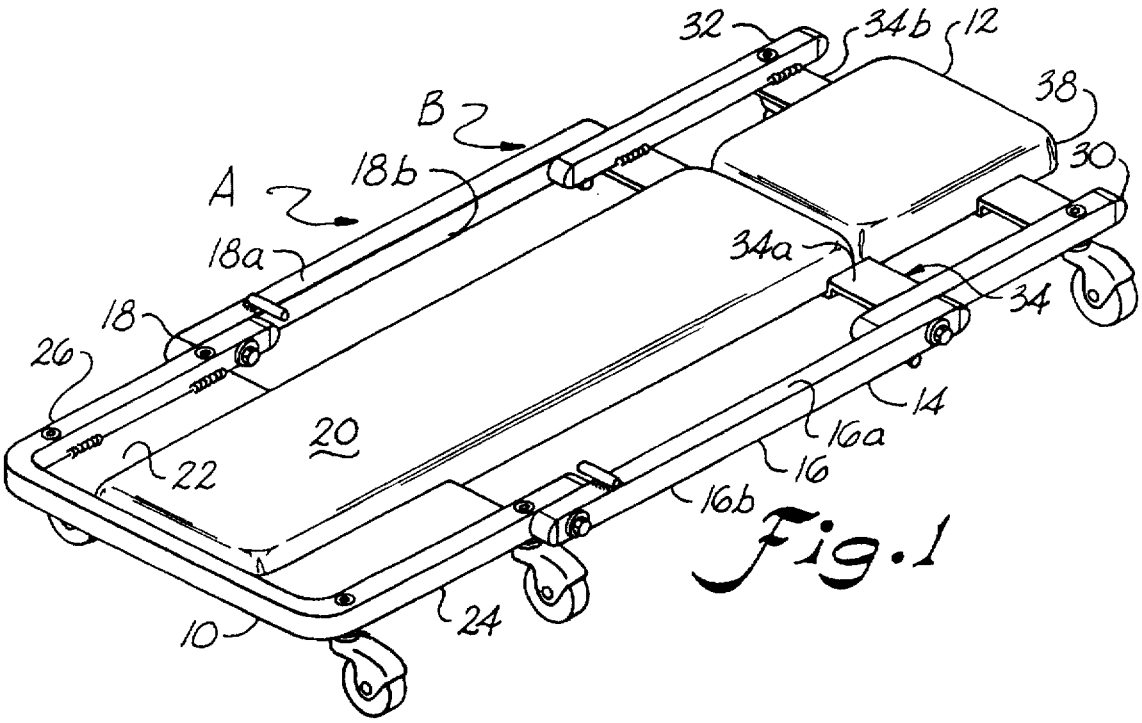
FIG. 1 is a perspective view of a transformable mechanic's creeper in a horizontal creeper position according to the invention.

FIG. 1 illustrates a transformable mechanic's creeper A for use by a worker working on an automobile or the like having an elongated creeper frame B in contact with a work floor. A base 10 is included on one end of elongated creeper frame B and a seal assembly 12 is interconnected in elongated creeper frame B on an opposite end away from base 10. Connector frame 14 interlinks base 10 with seat assembly 12. In the preferred embodiment, connector frame 14 includes a pair of interlinking connectors 16 and 18 which interlink seat assembly 12 with base 10. Interlinking connectors 16 and 18 each have an initial topside 16a and 18a respectively and bottom side 16b and 18b respectively. A removable insert pad 20 is carried by base 10 and seat assembly 12 for supporting a worker in a supine position.

Figure 2:
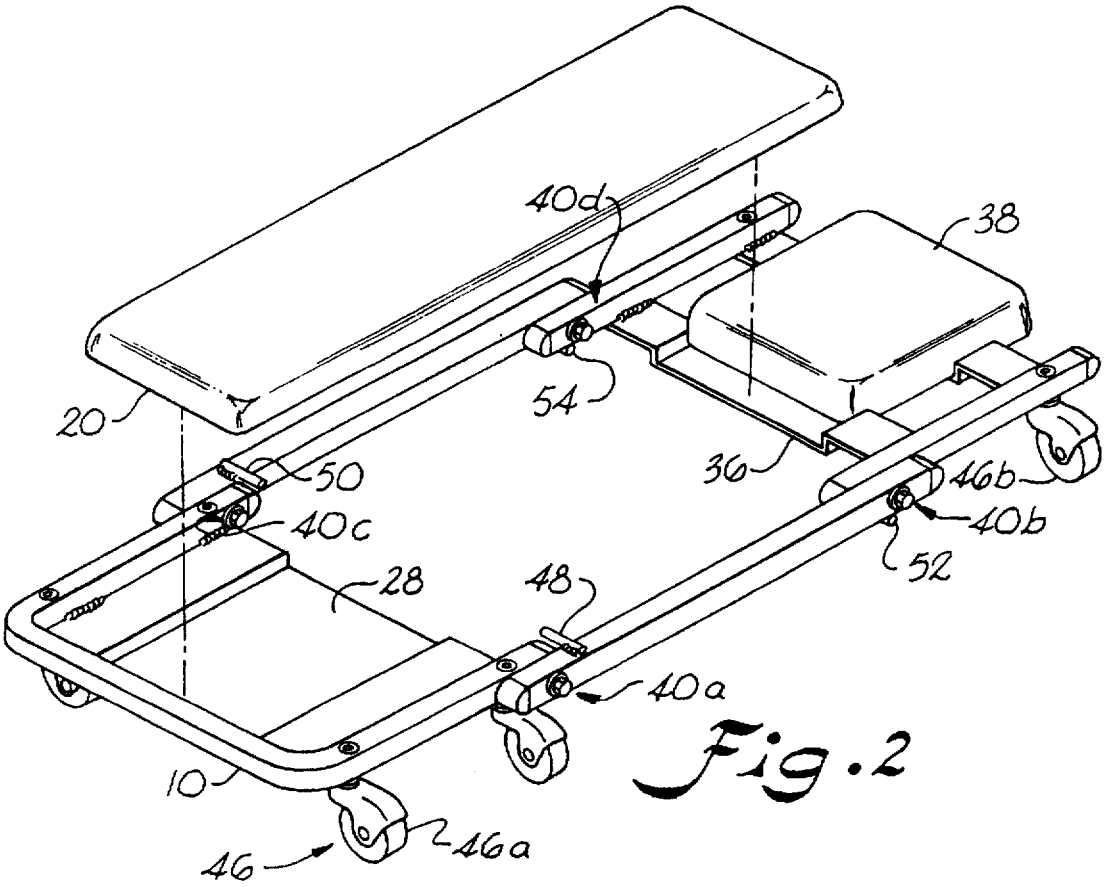
FIG. 2 is a perspective view illustrating the removable insert pad and associated structure according to the invention.

As shown in FIG. 2, base 10 includes a base member 22 which transverses spaced base frame legs 24 and 26. Base member 22 includes a base recess 28 which receives removable insert pad 20. Seat assembly 12 includes spaced seat frame legs 30 and 32 which are connected by a horizontal brace 34. In the preferred embodiment horizontal brace 34 includes a first brace 34a and a second brace 34b. Horizontal brace 34 includes a seat recess 36 for receiving insert pad 20. A seat 38 is also carried by brace 34.

As shown in FIG. 2, first interlocking connector 16 is pivotally connected to base leg 24 at first pivot point 40a and seat leg 30 at second pivot point 40b. Second interlocking connector 18 is pivotally connected to base leg 26 at third pivot point 40c and seat leg 32 at fourth pivot point 40d.

Figure 6:
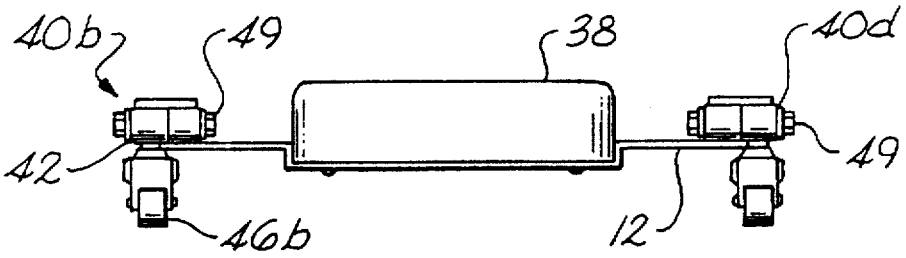
FIG. 6 is a front view of a transformable mechanic's creeper.

As shown in FIG. 6, second pivot point 40b consists of a pivot pin 42 which passes through apertures in first interlocking connector 16 and seat leg 30 and which is secured by bolts 49. First, third and fourth pivot points are of similar construction.

Figure 3:
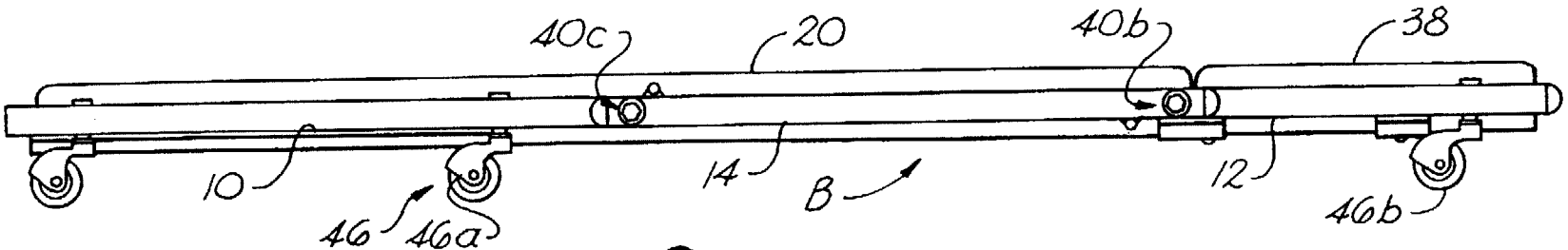
FIG. 3 is a side view of a transformable mechanic's creeper in a horizontal creeper position.

As shown in FIG. 3, connector frame 14 has a first pivot position in which seat assembly 12 is positioned generally in horizontal alignment with base 10 to define a creeper position. In the creeper position, base 10 and seat assembly 12 are disposed near opposing ends of elongated creeper frame B and removable insert pad 20 is received within base recess 28 and seat recess 36 providing a horizontal platform. Seat assembly 12 is longitudinally spaced from base 10 in the creeper position providing elongated creeper frame B with sufficient length to support a worker lying in a supine position. In the first pivot position, seat 38 is aligned with removable insert pad 20 providing a single horizontal platform which supports a worker lying in a supine position. Plurality of castors 46 depend from elongated creeper frame B. In the preferred embodiment, a first plurality of castors 46a depend from base 10 and at least one castor 46b depends from seat assembly 12 providing mechanic's creeper A with mobility.

Figure 4:
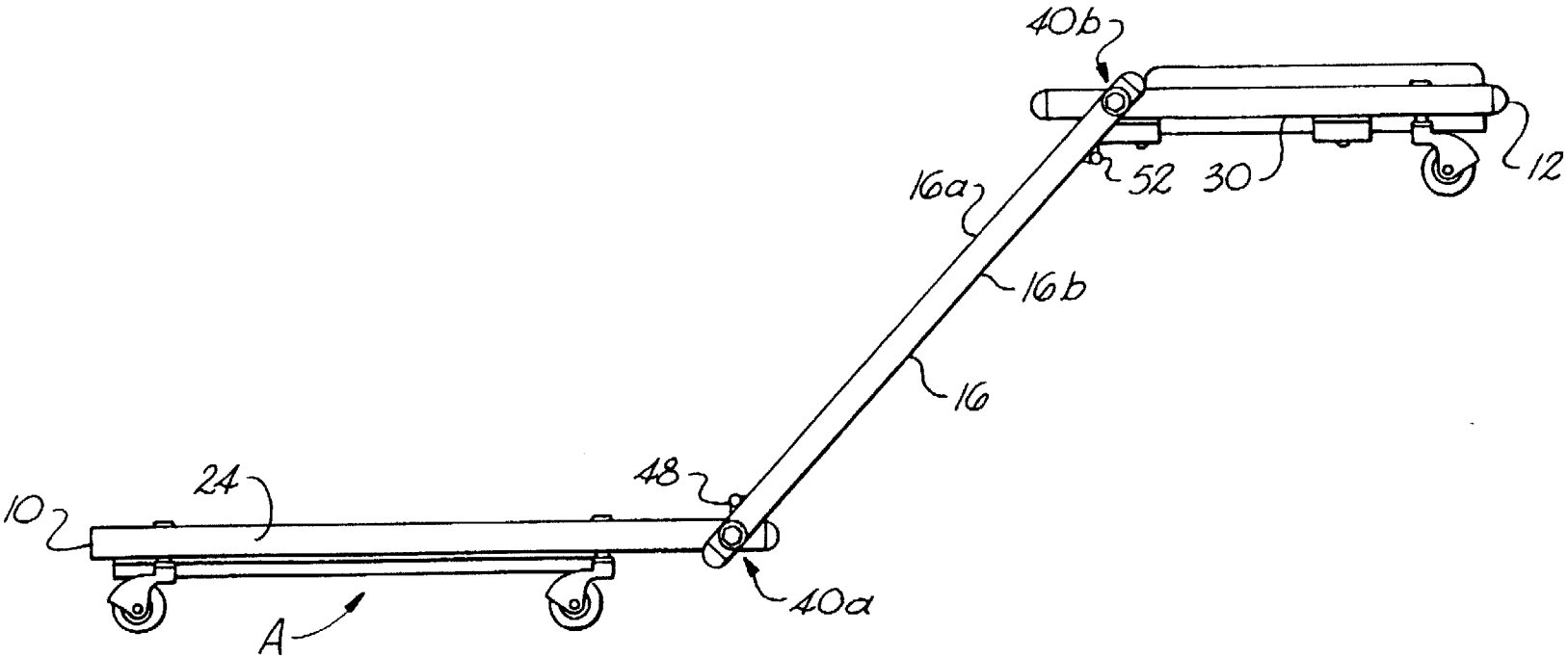
FIG. 4 is a side view of a transformable mechanic's creeper being positioned from either a creeper or seating position into the other of a creeper or seating position.

As shown in FIGS. 4, 5, 6 and 7, mechanic's creeper A is transformable into a seat after insert pad 20 has been removed from elongated creeper frame B. As shown in FIG. 4, connector frame 14 pivots counterclockwise around pivot points 40a and 40c located at the end of base frame legs 24 and 26 into a second pivot position. In the second pivot position, mechanic's creeper A is transformable into a seating position which consists of seat assembly 12, connector frame 14, and base 10 in a general Z configuration. In the seating position, seat frame legs 30 and 32 of seat assembly 12 pivot around pivot points 40b and 40d respectively so that seat 38 is generally vertically aligned with base 10 providing a horizontal seating platform.

In order to maintain mechanic's creeper A in a seating position, at lease one retention element retains seat assembly 12 above base 10. In a preferred embodiment, connector retention element 48 retains connector frame 14 upright. Connector retention element 48 may be comprised of a first plurality of stops 50 which prevent connector frame 14 from pivoting around pivot points 40a and 40c greater than a predefined angle. In the preferred embodiment, the angle between connector frame 14 and base 10 is an acute angle. First plurality of stops 50 prevent connector frame 14 from pivoting beyond the prescribed acute angle. Accordingly, first plurality of stops 50 may be connected to either base 10 or connector 14. In the preferred embodiment, first plurality of stops 50 are integral with initial top sides 16a and 18a of interlinking connectors 16 and 18 and contact base 10 thereby maintaining connector frame 14 in an upright position with respect to base 10.

Figure 5:
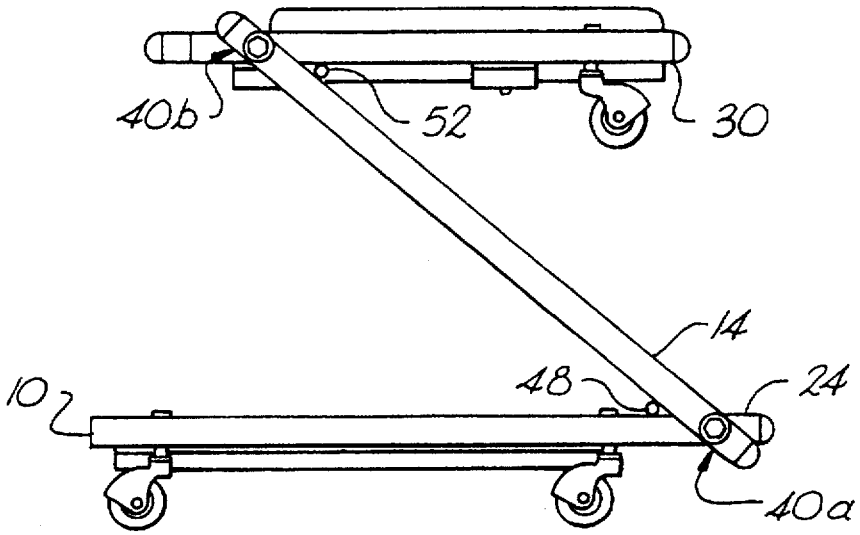
FIG. 5 is a side view of a transformable mechanic's creeper in a sitting position.
Figure 7:
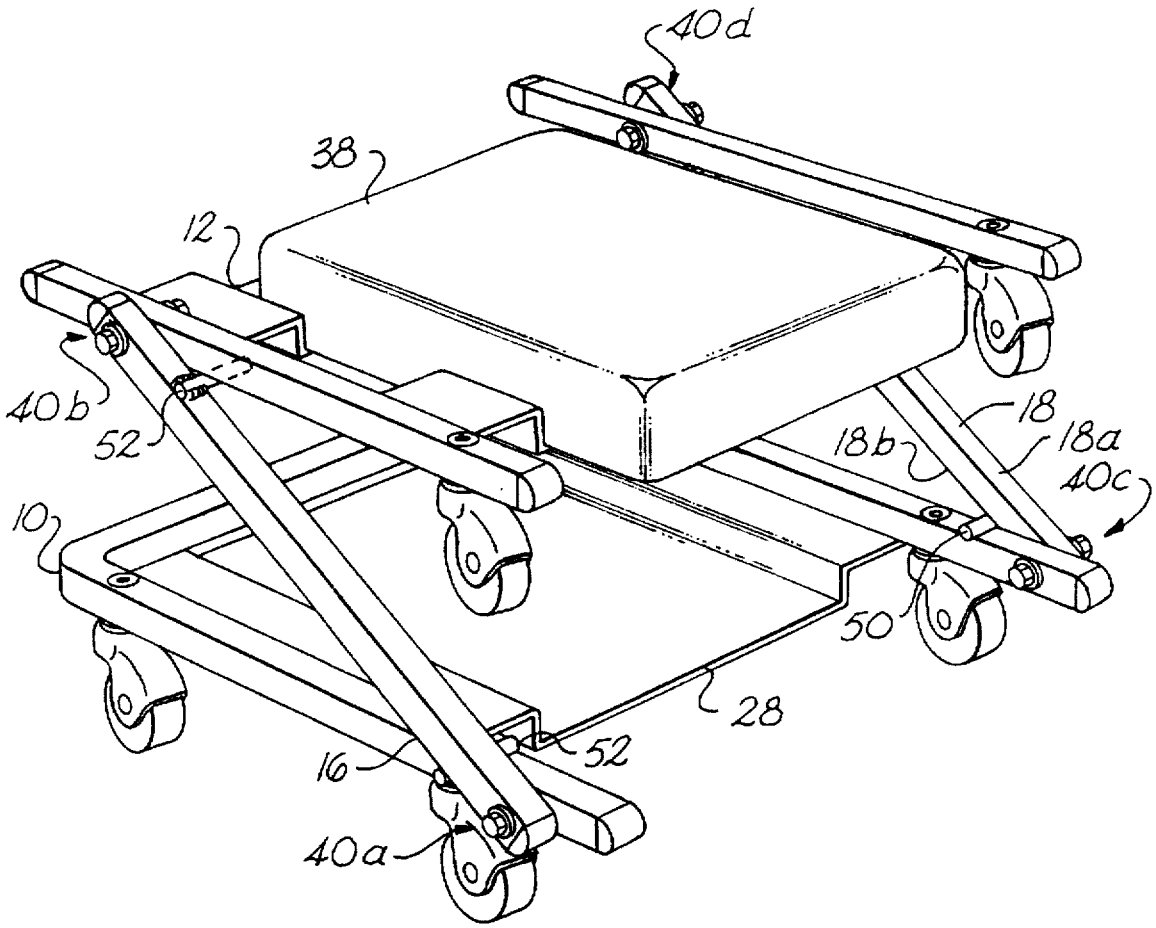
FIG. 7 is a perspective view of a transformable mechanic's creeper in a seating position according to the invention.

As shown in FIGS. 5 and 7, seat retention element 52 retains seat assembly 12 in a generally elevated horizontal position parallel to base 10 providing a seating platform for a worker. Seat retention element 52 may be comprised of a second plurality of stops 54 which prevent the excessive rotation of seat assembly 12 around pivot points 40b and 40d. Second plurality of stops 54 my be carried either by connector frame 14 or seat assembly 12. In the preferred embodiment, second plurality of stops 54 are integral with the initial bottom sides of 16b and 18b interlinking connectors 16 and 18 for contacting seat assembly 12 and maintaining seat assembly 12 in a generally vertical aligned position with base 10.

FIG. 7 illustrates mechanic's creeper A in a seating position. The weight of the worker sitting on seat 38 forces seat assembly 12 to contact second plurality of stops 54 of interlinking connector 14. Second plurality of stops 54 are placed farther away from pivot points 40a and 40c than first plurality of stops 50. First plurality of stops 50 are intermediary second plurality of stops 54 and pivot points 40a and 40c. Consequently, the weight of the worker forces interlinking connector 14 to pivot counterclockwise around pivot points 40a and 40c until lust plurality of stops 50 contacts base 10. With this design, the weight of the worker maintains mechanic's creeper A in the seating position. Base recess 28 may be used to store mechanic tools and the like.

In operation, mechanic's creeper A is easily transformable from a horizontal creeper to a vertical seat. To transform creeper A from a horizontal creeper position into a seating position, seat assembly 12 is lifted pivoting interlinking connector 14 counterclockwise around pivot points 40a and 40c. Seat assembly 12 is positioned in general vertical alignment with base 10 until connector retention element 48 contacts base 10. Seat assembly 12 is pivoted around pivot points 40b and 40d until seat assembly 12 contacts seat retention element 52. To transform mechanic's creeper A from a seating position into a horizontal creeper, seat assembly 12 is pulled forward pivoting interlinking connector 14 clockwise around pivot points 40a and 40c. Seat assembly 12 is lowered until castors 46 abut the ground. Accordingly, base 10 and corresponding castor 46 constantly remain in contact with a work floor providing the creeper and seat with mobility.

Thus, it can be seen than an advantageous construction can be had for a transformable mechanic's creeper according to the invention where the mechanic's creeper can readily be transformed between a horizontal creeper and a vertical seat. The pivoting interlinking connector provides the mechanic's creeper with sufficient length for a horizontal creeper and sufficient height for the vertical seat. The use of pivot points and stops enable the mechanic's creeper to be transformed from a horizontal creeper to a vertical seat with minimum effort.

While a preferred embodiment of the invention has been described using specific terms, such description is for illustrative purposes only, and it is to be understood that changes and variations may be made without departing from the spirit or scope of the following claims.

What is claimed is:

1. A transformable mechanic's creeper for use by a worker, said creeper transforming between a horizontal position for supporting said worker working underneath said automobile in a supine position and a seat position for supporting said worker working in an upright seating position, said creeper comprising:

an elongated creeper frame;

a base included in said elongated creeper frame;

plurality of castors, depending from said elongated creeper frame, said castors supporting said elongated creeper frame on a work floor providing said elongated creeper frame with mobility;

a seat assembly interconnected in said elongated creeper frame with said base;

at least one interlinking connector linking said seat assembly and base;

said interlinking connector having a first end pivotally connected to said base, and a second end pivotally connected to said seat assembly;

said interlinking connector having a first pivot position in which said seat assembly is positioned generally in horizontal alignment with said base to define a creeper position;

said interlinking connector having a second pivot position in which said seat assembly is positioned generally in vertical alignment with said base to define a seating position wherein said seat assembly and said base support said worker seated;

a first plurality of stops carried by one of said interlinking connector and said base, said first plurality of stops engaging the other of said base and interlinking connector to maintain said interlinking connector above said base; and a second plurality of stops carried by one of said interlinking connector and said seat assembly, said second plurality of stops engaging the other of said seat assembly and interlinking connector to maintain said seat assembly above said base.

2. The mechanic's creeper of claim 1 wherein said seat assembly is longitudinally spaced from said base when said interlinking connector is in said first pivot position providing said elongated creeper frame with sufficient length to support said worker lying in a supine position.

3. The mechanic's creeper of claim 1 wherein said base includes a base recess for receiving said insert pad thereby maintaining said insert pad within a predescribed height above a work floor.

4. The mechanic's creeper of claim 3 wherein said seat assembly includes a seat recess for receiving said insert pad thereby maintaining said insert pad within a predescribed height above a work floor.

5. The mechanic's creeper of claim 1 wherein said seat assembly includes at least one castor providing said mechanic's creeper mobility when said interlinking connector is in said first pivot position.

6. The mechanic's creeper of claim 1 wherein said interlinking connector includes a first and second interlinking connector each pivotally connected to said seat assembly end base.

7. The mechanic's creeper of claim 1 including at least one retention element carried by said elongated creeper frame retaining said seat and base vertical in said second pivot position to maintain said seating position.

8. The mechanic's creeper of claim 1 including a connector retention element, and a seat retention element maintaining said seat assembly generally parallel above said base when said interlinking connector is in said second pivot position.

9. The mechanic's creeper of claim 1 wherein said second plurality of stops are carried by said seat assembly.

10. The mechanic's creeper of claim 1 wherein said seat assembly includes a pair of spaced legs interconnected with a brace, said brace carrying a seat for supporting said worker in a seating position.

11. A transformable mechanic's creeper for use by a worker working on an automobile or the like, said mechanic's creeper transforming between a horizontal position for supporting said worker working underneath said automobile in a supine position and transforming into a seat position for supporting said worker working in an upright position, said mechanic's creeper comprising:

an elongated creeper frame;

a base included in said elongated creeper frame;

a seat assembly interconnected in said elongated creeper frame with said base;

at least one interlinking connector linking said seat assembly and base;

said interlinking connector having a first end pivotally connected to said base, and a second end pivotally connected to said seat assembly;

said interlinking connector having a first pivot position in which said seat assembly is positioned generally in horizontal alignment with said base to define a creeper position, and said base and seat assembly being disposed near opposing ends of said elongated creeper frame in said creeper position;

a removable insert pad carried by said seat assembly and said base when said interlinking connector is in said first pivot position to support said worker in a supine position;

said interlinking connector having a second pivot position in which said seat assembly is positioned generally in vertical alignment with said base to define a seating position wherein said seat assembly and said base to support said worker seated;

said removable insert pad being removed from said creeper frame where said interlinking connector is in said second pivot position; and a plurality of castors depending from said elongated creeper frame.

12. The mechanic's creeper of claim 11 including a first plurality of stops carried by one of said interlinking connector and said base, said stops engaging the other of said base and interlinking connector to maintain said interlinking connector above said base.

13. The mechanic's creeper of claim 12 including a second plurality of stops carried by one of said seat assembly or said interlinking connector, said second plurality stops engaging the other of said seat assembly and interlinking connector to maintain said seat assembly above said base.

*14. A transformable mechanic's creeper for use by a worker, said creeper transforming between a horizontal position for supporting said worker working underneath said automobile in a supine position and a seat position for*

*supporting said worker working in an upright seating position, said creeper comprising:*

*an elongated creeper frame;*

*a base included in said elongated creeper frame;*

*a seat assembly interconnected in said elongated creeper frame with said base;*

*at least one interlinking connector linking said seat assembly and base;*

*said interlinking connector having a first end pivotally connected to said base, and a second end pivotally connected to said seat assembly;*

*said interlinking connector having a first pivot position in which said seat assembly is positioned generally in horizontal alignment with said base to define a creeper position;*

*said interlinking connector having a second pivot position in which said seat assembly is positioned generally in vertical alignment with said base to define a seating position wherein said seat assembly and said base support said worker when seated; and*

*said seat assembly including at least one castor providing said mechanic's creeper mobility when said interlinking connector is in said first pivot position.*

*15. A transformable mechanic's creeper for use by a worker, said creeper transforming between a horizontal position for supporting said worker working underneath said automobile in a supine position and a seat position for supporting said worker working in an upright seating position, said creeper comprising:*

*an elongated creeper frame;*

*a base included in said elongated creeper frame;*

*a plurality of castors, carried by said elongated creeper frame, said castors supporting said creeper frame on a work floor providing said creeper frame with mobility;*

*a seat assembly interconnected in said elongated creeper frame with said base;*

*at least one interlinking connector linking said seat assembly and base;*

*said interlinking connector having a first end pivotally connected to said base, and a second end pivotally connected to said seat assembly;*

*said interlinking connector having a first pivot position in which said seat assembly is generally horizontally aligned with said base to define a creeper position;*

*said interlinking connector having a second pivot position in which said seat assembly is generally vertically aligned with said base to define a seating position wherein said seat assembly and said base support said worker seated;*

*at least one retention element for maintaining said interlinking connector in said second pivot position when said seat assembly is positioned in said seating position; and*

*at least one castor carried by said seat assembly providing said mechanic's creeper with mobility when said interlinking connector is in said first pivot position.*

*16. The mechanic's creeper of claim 15 wherein said seat assembly is longitudinally spaced from said base when said interlinking connector is in said first pivot position providing said elongated creeper frame with sufficient length to support said worker lying in a supine position.*

*17. The mechanic's creeper of claim 15 wherein said one retention element includes a connector retention element engaged between said interlinking connector and said base, and including at least one seat retention element engaged between said interlinking connector and said seat assembly for maintaining said seat assembly generally parallel above said base when said interlining connector is in said second pivot position.*

* * * * *

UNITED STATES PATENT AND TRADEMARK OFFICE

CERTIFICATE OF CORRECTION

PATENT NO. : RE 35,732 C1
APPLICATION NO. : 90/007323
DATED : August 22, 2006
INVENTOR(S) : Troy Shockley It is certified that error appears in the above-identified patent and that said Letters Patent is hereby corrected as shown below:

Title Page, Item (10) Number: "US RE35,732 F1" should read --US RE35,732 C1--.

Signed and Sealed this

Ninth Day of December, 2008

JON W. DUDAS
*Director of the United States Patent and Trademark Office*

US00RE35732F1

(12) EX PARTE REEXAMINATION CERTIFICATE (5478th)

United States Patent

Shockley

(10) Number: US RE35,732 F1

(45) Certificate Issued: Aug. 22, 2006

(54) TRANSFORMABLE MECHANIC'S CREEPER

(75) Inventor: Troy Shockley, 106 Robinall Dr., Easley, SC (US) 29642

(73) Assignee: Troy Shockley, Easley, SC (US)

Reexamination Request:
No. 90/007,323, Apr. 19, 2005

Reexamination Certificate for:

| | |
|---|---|
| Patent No.: | **Re. 35,732** |
| Issued: | **Feb. 17, 1998** |
| Appl. No.: | **08/649,852** |
| Filed: | **May 8, 1996** |

Certificate of Correction issued Sep. 1, 1998.

Related U.S. Patent Documents

Reissue of:

| | |
|---|---|
| (64) Patent No.: | **5,451,068** |
| Issued: | **Sep. 19, 1995** |
| Appl. No.: | **08/243,715** |
| Filed: | **May 17, 1994** |

(51) Int. Cl.
*B25H 5/00* (2006.01)

(52) U.S. Cl. ..... 280/32.6

(58) Field of Classification Search ..... None
See application file for complete search history.

(56) References Cited

U.S. PATENT DOCUMENTS

| | | | | |
|---|---|---|---|---|
| 1,098,262 A | | 5/1914 | Hollingshead | |
| 1,363,023 A | | 12/1920 | Taylor | |
| 2,595,783 A | * | 5/1952 | Griffin | 280/32.6 |
| 2,595,784 A | * | 5/1952 | Griffin et al. | 280/32.6 |
| 4,505,495 A | | 3/1985 | Foss | |
| 4,580,799 A | | 4/1986 | Quinonez | |

FOREIGN PATENT DOCUMENTS

| | | |
|---|---|---|
| CH | 247370 | 12/1947 |
| FR | 2554333 | 5/1985 |
| GB | 493280 | 10/1938 |

* cited by examiner

*Primary Examiner*—Peter C. English

(57) ABSTRACT

A transformable mechanic's creeper is disclosed having an elongated creeper frame which includes a base and a seat assembly interconnected by at least one interlinking connector pivotally connected to the base and the seat assembly. The interlinking connector has a first pivot position in which the seat assembly is positioned generally in horizontal alignment with the base for defining a creeper position, and a second pivot position in which the seat assembly is positioned generally in vertical alignment with the base to define a seating position wherein the seat assembly and the base support a worker in an upright seating position. A removable insert pad carried within the elongated creeper frame supports a worker in a supine position support.

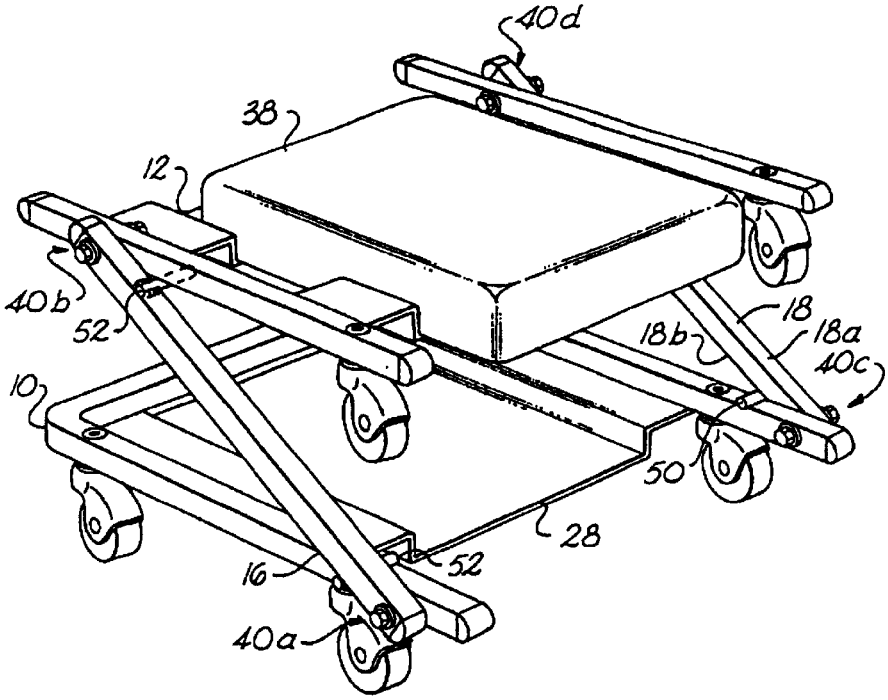

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentablility of claims 1, 2, 5 and 8–10 is confirmed.

Claim 17 is cancelled.

Claims 3, 6, 7, 11 and 13–15 are determined to be patentable as amended.

Claims 4, 12 and 16, dependent on an amended claim, are determined to be patentable.

3. The mechanic's creeper of claim 1 wherein said base includes a base recess for receiving [said] *an* insert pad thereby maintaining said insert pad within a predescribed height above a work floor.

6. The mechanic's creeper of claim 1 wherein said interlinking connector includes a first and second interlinking connector each pivotally connected to said seat assembly [end] *and* base.

7. The mechanic's creeper of claim 1 including at least one retention element carried by said elongated creeper frame retaining said seat *assembly* and base *in* vertical *alignment* in said second pivot position to maintain said seating position.

11. A transformable mechanic's creeper for use by a worker working on an automobile or the like, said mechanic's creeper transforming between a horizontal position for supporting said worker working underneath said automobile in a supine position and transforming into a seat position for supporting said worker working in an upright position, said mechanic's creeper comprising:

an elongated creeper frame;

a base included in said elongated creeper frame;

a seat assembly interconnected in said elongated creeper frame with said base;

at least one interlinking connector linking said seat assembly and base;

said interlinking connector having a first end pivotally connected to said base, and a second end pivotally connected to said seat assembly;

said interlinking connector having a first pivot position in which said seat assembly is positioned generally in horizontal alignment with said base to define a creeper position, and said base and seat assembly being disposed near opposing ends of said elongated creeper frame in said creeper position;

a removable insert pad carried by said seat assembly and said base when said interlinking connector is in said first pivot position to support said worker in a supine position;

said interlinking connector having a second pivot position in which said seat assembly is positioned generally in vertical alignment with said base to define a seating position wherein said seat assembly and said base [to] support said worker seated;

said removable insert pad being removed from said creeper frame [where] *when* said interlinking connector is in said second pivot position; and a plurality of castors depending from said elongated creeper frame.

13. The mechanic's creeper of claim 12 including a second plurality of stops carried by one of said seat assembly [or] *and* said interlinking connector, said second plurality stops engaging the other of said seat assembly and *said* interlinking connector to maintain said seat assembly above said base.

14. A transformable mechanic's creeper for use by a worker, said creeper transforming between a horizontal position for supporting said worker working underneath said automobile in a supine position and a seat position for supporting said worker working in an upright seating position, said creeper comprising:

an elongated creeper frame;

a base included in said elongated creeper frame;

a plurality of castors, depending from said elongated creeper frame, said castors supporting said elongated creeper frame on a work floor providing said elongated creeper frame with mobility;

a seat assembly interconnected in said elongated creeper frame with said base;

at least one interlinking connector linking said seat assembly and base;

said interlinking connector having a first end pivotally connected to said base, and a second end pivotally connected to said seat assembly;

said interlinking connector having a first pivot position in which said seat assembly is positioned generally in horizontal alignment with said base to define a creeper position;

said interlinking connector having a second pivot position in which said seat assembly is positioned generally in vertical alignment with said base to define a seating position wherein said seat assembly and said base support said worker when seated,

*a first stop on said interlinking connector engageable with said base maintaining said interlinking connector in said second pivot position when moved thereto,*

*a second stop on said interlinking connector engageable with and maintaining said seat assembly in said seating position when said interlinking connector is in said second position,* and said seat assembly including at least one castor providing said mechanic's creeper mobility when said interlinking connector is in said first pivot position.

15. A transformable mechanic's creeper for use by a worker, said creeper transforming between a horizontal position for supporting said worker working underneath said automobile in a supine position and a seat position for supporting said worker working in an upright seating position, said creeper comprising:

an elongated creeper frame;

a base included in said elongated creeper frame;

a plurality of castors, carried by said elongated creeper frame, said castors supporting said creeper frame on a work floor providing said creeper frame with mobility;

a seat assembly interconnected in said elongated creeper frame with said base;

at least one interlinking connector linking said seat assembly and *said* base;

said interlinking connector having a first end pivotally connected to said base, and a second end pivotally connected to said seat assembly;

said interlinking connector having a first pivot position in which said seat assembly is generally horizontally aligned with said base to define a creeper position;

said interlinking connector having a second pivot position in which said seat assembly is generally vertically aligned with said base to define a seating position wherein said seat assembly and said base support said worker seated;

at least one *connector* retention element *engaged between said interlinking connector and said base* for maintaining said interlinking connector in said second pivot position when said seat assembly is positioned in said seating position;

*at least one seat retention element engaged between said interlinking connector and said seat assembly for maintaining said seat assembly generally parallel above said base when said interlinking connector is in said second pivot position,* and at least one castor carried by said seat assembly providing said mechanic's creeper with mobility when said interlinking connector is in said first pivot position.

* * * * *